(12) United States Patent
Kanj et al.

(10) Patent No.: US 11,937,347 B2
(45) Date of Patent: Mar. 19, 2024

(54) METHOD FOR ADAPTING SETPOINTS FOR A DIGITAL LIGHTING UNIT OF A MOTOR VEHICLE

(71) Applicant: VALEO VISION, Bobigny (FR)

(72) Inventors: Ali Kanj, Bobigny (FR); Constantin Prat, Bobigny (FR)

(73) Assignee: VALEO VISION, Bobigny (FR)

( * ) Notice: Subject to any disclaimer, the term of this patent is extended or adjusted under 35 U.S.C. 154(b) by 11 days.

(21) Appl. No.: 17/766,473

(22) PCT Filed: Sep. 30, 2020

(86) PCT No.: PCT/EP2020/077287
§ 371 (c)(1),
(2) Date: Apr. 4, 2022

(87) PCT Pub. No.: WO2021/063977
PCT Pub. Date: Apr. 8, 2021

(65) Prior Publication Data
US 2023/0269842 A1    Aug. 24, 2023

(30) Foreign Application Priority Data
Oct. 4, 2019 (FR) .................... 19 11047

(51) Int. Cl.
| | |
|---|---|
| *H05B 45/10* | (2020.01) |
| *F21S 41/141* | (2018.01) |
| *F21S 43/14* | (2018.01) |
| *H05B 45/325* | (2020.01) |
| *H05B 45/37* | (2020.01) |
| *H05B 45/44* | (2020.01) |

(52) U.S. Cl.
CPC ............ *H05B 45/10* (2020.01); *F21S 41/141* (2018.01); *F21S 43/14* (2018.01); *H05B 45/325* (2020.01); *H05B 45/37* (2020.01); *H05B 45/44* (2020.01)

(58) Field of Classification Search
CPC ............................. F21S 41/153; H05B 45/10
See application file for complete search history.

(56) References Cited

U.S. PATENT DOCUMENTS

| | | |
|---|---|---|
| 2006/0103621 A1 | 5/2006 | Feng |
| 2009/0109165 A1 | 4/2009 | Park et al. |

(Continued)

FOREIGN PATENT DOCUMENTS

| | | |
|---|---|---|
| DE | 102014108239 A1 | 12/2015 |
| FR | 3062217 A1 | 7/2018 |

OTHER PUBLICATIONS

International Search Report dated Nov. 20, 2020 in PCT/EP2020/077287 filed Sep. 30, 2020, citing documents AA-AD therein, 2 pages.

(Continued)

*Primary Examiner* — Robert J May
(74) *Attorney, Agent, or Firm* — Oblon, McClelland, Maier & Neustadt, L.L.P.

(57) ABSTRACT

A method for adapting a digital lighting setpoint intended to be projected by a digital lighting unit for a motor vehicle including a matrix light source and an optical system. The method includes a step of applying a digital filtering to the digital setpoint. The filter used is capable of taking into account the interferences of light intensities between the elementary light sources of the matrix light source.

20 Claims, 3 Drawing Sheets

(56) References Cited

U.S. PATENT DOCUMENTS

| | | |
|---|---|---|
| 2011/0267455 A1 | 11/2011 | Goetz et al. |
| 2017/0305327 A1 | 10/2017 | Hoffmann et al. |
| 2019/0299843 A1 | 10/2019 | Roels et al. |
| 2022/0128210 A1* | 4/2022 | Huester ................ F21S 41/645 |

OTHER PUBLICATIONS

Office Action dated Oct. 19, 2023 in Chinese Patent Application No. 202060069420.9 with an English summary translation, 12 pages.

* cited by examiner

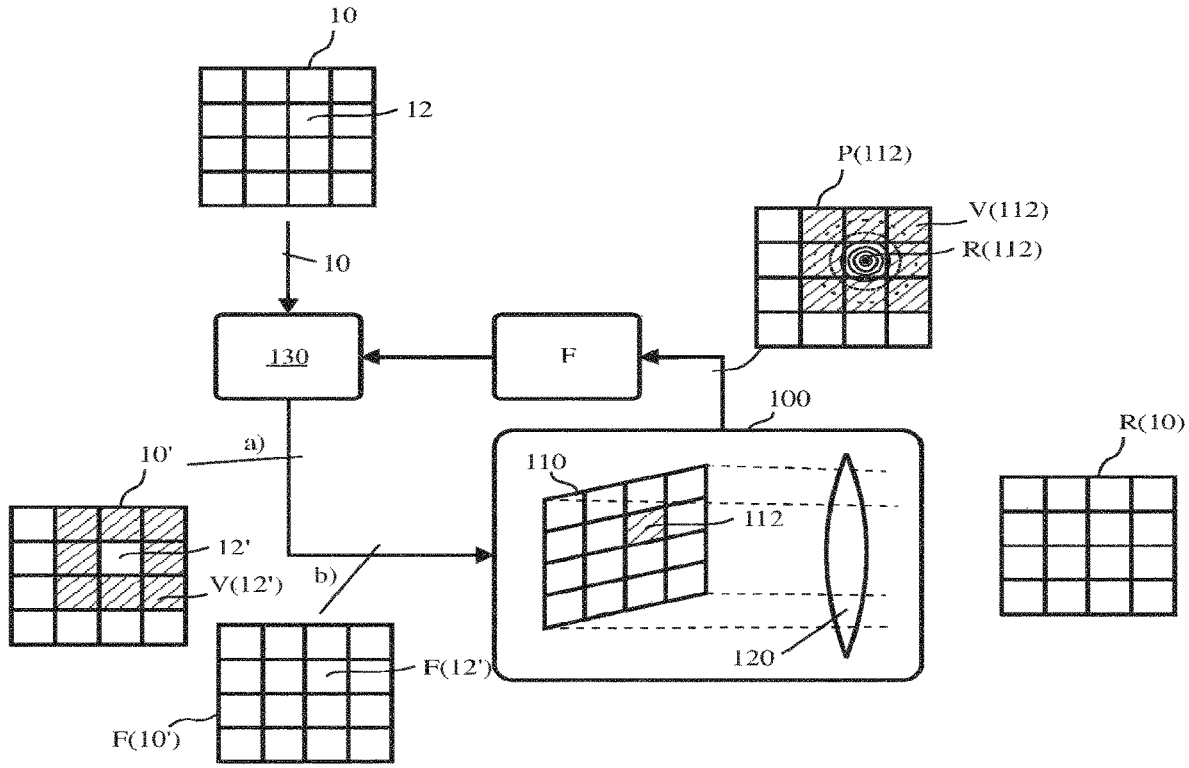

METHOD FOR ADAPTING SETPOINTS FOR A DIGITAL LIGHTING UNIT OF A MOTOR VEHICLE

The invention relates to lighting modules for motor vehicles. In particular, the invention relates to control methods for such modules involving matrix light sources.

A light-emitting diode (LED) is a semiconductor electronic component capable of emitting light when it is subjected to an electric current having at least one threshold intensity. In the automotive field, LED technology is increasingly being used for numerous light signaling solutions. LED matrices are of particular interest in the field of automotive lighting. Matrix light sources can be used for "leveling"-type functions, i.e. adjusting the height of the emitted light beam according to the attitude of the vehicle and the profile of the road. Other applications include DBL ("digital bending light") which corresponds to adjusting the direction of the emitted light beam in order to follow the road in the horizontal plane, ADB ("adaptive driving beam") which corresponds to an anti-dazzle function that generates shaded areas in the light beam emitted by a high beam so as not to disrupt other road users, as well as functions for projecting patterns on the ground using the pixelated light beam. The contours of shaded areas must be well defined and reproducible by a lighting device in order to comply with stringent regulations.

It is known practice to use light sources with different types of technology for the aforementioned lighting applications. This may include, for example, monolithic technology, according to which a large plurality of LED-type elementary sources, equivalent to pixels, are etched into a common semiconductor substrate. Integrated electrical connections allow the pixels to be activated independently of one another. Another known technology is that of microLEDs, which produces a matrix of LEDs of small size, typically smaller than 150 µm. There are also modules of micromirror, or DMD ("digital micromirror device"), type, which involve a projection technology using an intensity modulator on a uniform beam. Micromirrors, the position of which is controlled by means of piezoelectric elements, are oriented so as to selectively reflect an incident light beam, so that each micromirror corresponds to an elementary source of the pixel matrix thus produced. The light from a source is directed onto the matrix of micromirrors by an optic.

However, these types of technology involve high proximity between the light sources, which creates interference (also called crosstalk) in the elementary beams emitted by neighboring light sources. It has thus been observed that the light intensity of a pixel supposedly emitted by one of the light sources does not correspond to the setpoint value associated with this light source. Specifically, only part of the elementary beam emitted by this light source is used to produce the pixel and part of the elementary beams emitted by the neighboring light sources is further added thereto. The resulting light intensity is thus different from the expected setpoint value, which makes controlling the light module to emit a pixelated light beam conforming to that of the digital image supplied to the controller complex and unreliable.

The light emitted by a matrix light source also generally passes through an optic comprising at least one optical lens, in order to project the desired contour ahead of the motor vehicle. However, for a given matrix light source and an associated output optical system, the response of the elementary light sources of the matrix through the optical system is not homogeneous. Typically, a central region is able to project at a high resolution, while the resolution decreases progressively toward the edges of the field of view of the light source, which may equally have a large aperture of the order of 35°. The projection of precise contours in regions of lower resolution (i.e. at the edges of the field of view) is therefore difficult or even impossible using known solutions. The result of projecting a precise contour or pattern in such a region is usually a blurred contour or pattern.

One aim of the invention is to overcome at least one of the problems posed by the prior art. In particular, an object of the invention is to propose a method that can increase the precision of patterns or contours projected by means of a matrix light source.

According to a first aspect of the invention, a method for adapting a digital lighting setpoint is proposed. The digital lighting setpoint is intended to be projected by a digital lighting unit of a motor vehicle, comprising a matrix light source and an optical system. The digital lighting setpoint comprises an elementary light intensity setpoint for each elementary light source of the matrix light source. The method is noteworthy in that it comprises:

a) a step of converting, by means of a computing unit, each elementary light intensity setpoint into a parameter of an electrical signal to be applied to the elementary light source in order to achieve said elementary light intensity setpoint;

b) a step of applying, by means of a computing unit, a digital filtering to a matrix grouping together the set of parameters before relaying the filtered parameters to the lighting unit. The digital filtering of a given parameter takes into account the light response of the corresponding elementary light source, this response comprising the contribution of the light beam generated by said light source with respect to the light intensity of the corresponding projected pixel and with respect to the light intensity of the projected pixels that form part of a predetermined spatial neighborhood of said projected pixel.

Preferably, the method may comprise a step of controlling, by means of a control unit, said light source by using electrical signals parameterized by said filtered parameters.

Said digital lighting setpoint may preferably comprise a desired digital image or photometry.

Preferably, the method may comprise a prior step of receiving a digital image of the desired pixelated light beam, a step of dividing said digital image up into a plurality of regions, each region being associated with one of the elementary light sources of the matrix light source, and a step of calculating an elementary light intensity setpoint value for each of the elementary light sources from the region associated with this elementary light source. In other words, the digital image is divided up into as many regions as the matrix light source comprises elementary light sources, each region corresponding to the pixel being able to be emitted by one of these elementary light sources. For example, the elementary light intensity setpoint value attributed to each of the elementary light sources may preferably correspond to the average light intensity in the region associated with this light source.

Preferably, the electrical signal may be a pulse-width-modulated electrical signal, said parameter being the duty cycle of this electrical signal.

The neighborhood of a pixel may, for example, cover a predetermined number of pixels surrounding this pixel. Alternatively, it may cover all the pixels in a circle having said pixel as its center.

The method may preferably comprise a preliminary step of measuring, for each elementary light source, the light response projected by the corresponding elementary light source. Alternatively, the light responses are obtained by digital simulation using a computing unit and a model of the matrix light source, and of its emission properties.

The light response for each elementary light source may preferably be stored in a memory element in the form of a distribution matrix, the distribution matrix comprising the digitized contribution of the light beam generated by said elementary light source with respect to the light intensity of the corresponding projected pixel as central element. The distribution matrix may further comprise the digitized contribution of the light beam generated by said elementary light source with respect to the intensity of the projected pixels that form part of a predetermined spatial neighborhood of said projected pixel as peripheral elements. Each element of the matrix P(112) thus corresponds to a projected pixel.

Preferably, the step of applying the digital filtering may comprise the following steps:

for each parameter of the matrix of parameters, the parameter being associated with an elementary light source and with a distribution matrix, considering a neighborhood of parameters corresponding to the neighborhood defined by the distribution matrix;
  using the computing unit, multiplying one-by-one the elements of a normalized representation of the distribution matrix and the neighborhood of parameters;
  using the computing unit, calculating the arithmetic mean of the results of these multiplications, in order to obtain the filtered parameter.

The conversion step may preferably comprise applying a conversion function defined previously for each elementary light source.

Said filtering may preferably comprise applying a dedicated digital filter for each of the elementary light setpoints.

Preferably, said filtering may comprise applying a dedicated digital filter for each column or row of elementary light setpoints.

The lighting setpoint may preferably correspond to a digital image having a resolution at least equal to the projection resolution of the lighting device.

According to another aspect of the invention, a lighting device for a motor vehicle is proposed. The lighting device comprises a digital lighting unit having a matrix light source composed of elementary light sources as well as an optical system. The device further comprises a data reception unit intended to receive a lighting setpoint. The lighting device is noteworthy in that it comprises a computing unit configured to adapt a received lighting setpoint in accordance with the method according to one aspect of the present invention. The device further comprises a control unit intended to control the lighting unit by means of electrical signals parameterized by the filtered parameters.

According to yet another aspect of the invention, a computer program is proposed, comprising a sequence of instructions which, when they are executed by a processor, result in the processor implementing a method according to one aspect of the present invention.

According to a final aspect of the invention, a non-transitory computer-readable storage medium is proposed, said medium storing a computer program according to one aspect of the present invention.

Preferably, the control unit and/or the computing unit may comprise a microcontroller element or a data processor programmed with a suitable computer program in order to carry out said method.

The arrangement of the optical system may preferably be such that the light emitted by the elementary light sources of the lighting unit passes therethrough. The optical system may preferably comprise at least one optical lens.

The data reception unit may preferably comprise a network interface capable of receiving/sending data over a data bus internal to the motor vehicle. For example, the bus may be a CAN (Controller Area Network) bus, an Ethernet bus, a bus of gigabit multimedia serial link, GMSL, type, or a bus using low-voltage differential signaling, LVDS, technology, such as an FPD-Link III bus.

The matrix light source may preferably comprise a monolithic source, comprising elementary light-emitting light sources with semiconductor elements that are etched into a common substrate and are activatable independently of one another.

The matrix light source may preferably comprise a microLED-type matrix, comprising a matrix of elementary sources produced by light-emitting diodes, LEDs, of small size, typically smaller than 150 µm.

The matrix light source may preferably comprise a micromirror device, DMD, (digital micromirror device), in which an elementary source comprises a micromirror in a matrix, which selectively reflects an incident light beam according to its position.

By using the aspects according to the invention, it becomes possible to pre-emptively anticipate the effects of interference (crosstalk) between close-together elementary light sources of a matrix light source. The image projected by a light source controlled by means of the signals adapted according to the aspects of the invention is consequently closer to the desired setpoint image. This is achieved using a digital method, preferably implemented by computer software. The solution therefore does not require the use of more expensive optics which could correct these undesirable effects. This approach makes it possible to keep the production cost of the proposed lighting device relatively stable while clearly improving its optical behavior. This improvement is all the more useful when the lighting device performs an "adaptive driving beam", or ADB, function, which requires the projection of precise contours and patterns, while requiring a lower luminosity. Rather than aiming to produce each elementary light intensity setpoint, pixel by pixel, in an exact manner, the method makes it possible to produce contours or gradients of desired luminosity in the setpoint image in a sharper manner overall by taking into account the light interference that occurs when producing the setpoint image.

Other features and advantages of the present invention will be better understood from the description of examples, and from the drawings, in which:

FIG. 1 is an illustration of a method according to one preferred embodiment of the invention;

FIG. 2 is an illustration of a matrix comprising the light distribution produced by an elementary light source, in accordance with one preferred embodiment of the invention;

FIG. 3 is an illustration of a normalized version of the matrix illustrated by FIG. 2;

Figure 4:
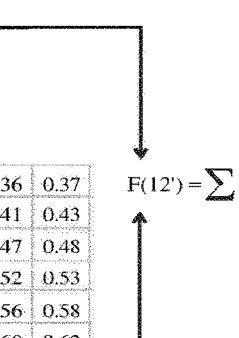
FIG. 4 illustrates an example of digital filtering in accordance with one preferred embodiment of the invention.

Unless specified otherwise, technical features that are described in detail for one given embodiment may be combined with the technical features that are described in the context of other embodiments described by way of example and without limitation.

The description focuses on the elements of a lighting module for a motor vehicle that are required to understand the invention. Other elements, which in a known manner form part of such modules, will not be mentioned or described in detail. For example, the presence and operation of a converter circuit involved in supplying power to a matrix light source, known per se, will not be described in detail.

The output of a light-emitting-diode light source may, in known manner, be influenced by driving its electric current supply by means of a pulse-width-modulation, or PWM, signal, which is characterized by a duty cycle representative of the desired output. The invention uses this principle to implement a method that makes it possible to achieve desired light setpoints with a high degree of optical predictability.

The illustration in FIG. 1 shows the provision of a digital lighting setpoint 10 intended to be projected by a digital lighting unit 100. The digital setpoint comprises, for example, an image of which each pixel 12 comprises a light intensity value, which should ideally be reproduced by a corresponding elementary light source 112 of a matrix light source 110 of the digital lighting unit 100. Alternatively, the elementary digital setpoint 12 may correspond to a region of pixels of a digital setpoint image having a higher resolution than the projection resolution of the matrix source 110. The matrix source 110 may comprise a monolithic source, a digital micromirror device, or other matrix light sources known in the art. The digital lighting unit 100 also comprises an optical system comprising at least one optical lens 120, arranged downstream of the matrix light source, following the direction of the emitted light. A computing unit 130, such as a processor or a microcontroller element programmed for this purpose, first converts each elementary light intensity setpoint 12, corresponding to an element of the setpoint 10, into a parameter 12' of an electrical signal intended to control a corresponding elementary light source 112, so that the latter achieves the elementary light intensity setpoint 12. Typically, the parameter 12' is a duty cycle of a PWM control signal, applied to an electric current converter. This corresponds to step a) of the proposed method.

In a second step denoted b), the computing unit applies a digital filtering F to the matrix 10' which combines the parameters resulting from the conversion of the previous step. The set of filtered parameters F(10') is then relayed to the lighting unit 110 in order to control the matrix light source 110 in accordance with the filtered parameters. The result of that is a projection R(10) that approximates the desired setpoint 10.

The digital filtering takes into account the light response of the corresponding elementary light source 112. This light response comprises the contribution of the light beam generated by the corresponding elementary light source 112 with respect to the light intensity of the corresponding projected pixel R(112), which is measured or simulated beforehand. The light response also comprises the contribution of the light beam generated by the elementary light source 12 with respect to the light intensity of the projected pixels that form part of a predetermined spatial neighborhood V(112) of said projected pixel R(112). In the example shown by FIG. 1, this neighborhood comprises the seven pixels immediately adjacent to the projected pixel R(112). In general, the neighborhood of the projected pixel R(112) may be determined as comprising all of the pixels that have a luminosity greater than a predetermined threshold value, when only the elementary light source 112 is on. Preferably, these preliminary measurements may be carried out for different degrees of luminosity. Thus, the neighborhood V(112) preferably comprises the pixels for which the spatial light distribution projected by the corresponding elementary source 112 is perceptible. The numerical values for this light response or light distribution for the neighborhood of projected pixels V(112) thus determined are preferably stored beforehand in a memory element in matrix form: each element of the matrix corresponds to a physical location of a projected pixel, so that the matrix P(112) is a sampled version of the light response, or equivalently spatial light distribution, generated by the elementary light source 112.

By way of example, the conversion of step a) may comprise the following sub-steps. In a first sub-step, for example carried out at the end of the production of the light device in question or before the first drive of the motor vehicle equipped with the light device, there will be defined a conversion function of the light module between the duty cycle values defined by a controller and the light intensity of the elementary light beams emitted by the elementary light sources 112 of the matrix light source 110.

To that end, the controller will sequentially transmit a plurality of predetermined duty cycle values to an integrated controller of the pixelated light source in such a way that the pixelated light source 110 emits a plurality of complete pixelated light beams having different intensities. The predetermined values are duty cycle values increasing at regular intervals, from 0 to 100%. All of the elementary light sources are thus controlled in the same way, all of the pixels thus being on for each duty cycle occurrence, each light beam thus forming a "blank page" of increasing intensity.

For each occurrence of a duty cycle, the maximum intensity Imax of the pixelated light beam emitted by the light module is measured. Lastly, the various measured light intensity values are extrapolated in order to define a conversion function between duty cycle and light intensity actually emitted. In the example described, the extrapolated conversion function is a second-degree polynomial function defined by the following equation $I_m = 0.76\ \alpha + 0.24\ \alpha^2$, where Im is the light intensity actually emitted and a is the duty cycle of the electrical signal applied to the pixelated light source 110.

The complementary conversion function is then applied in step a) in order to transform each elementary light intensity setpoint into a corresponding duty cycle adapted to the elementary light source that will have to achieve the setpoint in question.

FIG. 2 shows an example of a matrix P(112) as described in the context of the description in relation to FIG. 1, for a given elementary light source 112. The light intensity generated by the light source 112 is stored in the central element denoted $P_{13}$, while the intensities close to the corresponding spatial light distribution are stored in the other elements of the matrix. This is a representation of the spatial sampling of the light distribution generated by the elementary light source 112.

FIG. 3 shows a normalized version of the matrix P(112). Such a normalized version K is used in one preferred embodiment of the proposed digital filtering F. The elements of the illustrated normalized matrix K are generated by the computing unit 130 according to the following formulas for a neighborhood of 24 pixels. It goes without saying that the formulas may be adapted to neighborhoods of different sizes without departing from the scope of the invention:

$$K_i = -\frac{P_i}{\sum_{i=1}^{25} P_i},$$

then, for the central element: $K_{13}=1-\Sigma_{i\neq 13} K_i$, such that the sum of the elements of the normalized matrix is equal to one.

Finally, FIG. 4 shows an example of digital filtering F in accordance with one preferred embodiment of the invention. The normalized version K of a spatial distribution matrix P(112) relating to a given elementary light source 112 of a matrix light source is shown at the top left. Below, the converted version 10' of a set of light setpoints 10 to be produced by the matrix source is shown. The inputs of the matrix 10' correspond to parameters and more precisely to duty cycles of a PWM signal, as explained previously. On the right of FIG. 5, the result F(12') of the filtering of the value 12' is shown. The neighborhood V(12') of parameters that correspond to the neighborhood V(112) characterized by the distribution matrix P(112) are considered. Next, the computing unit (130) multiplies the elements of the matrix K one-by-one with this neighborhood V(12'). The arithmetic mean of the results of these multiplications gives the filtered value F(12') of the parameter, which will be used to control the corresponding elementary light source. The described method is applied to each elementary setpoint using the data P, K relating thereto. It can be seen that in this example, where the converted photometry or setpoint P(112) comprises homogeneous values, there is almost no need for correction.

Figure 5:
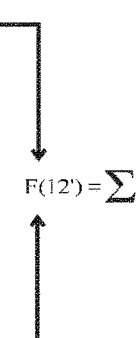
FIG. 5 illustrates an example of digital filtering in accordance with one preferred embodiment of the invention.

FIG. 5 shows a second exemplary calculation for a set of converted elementary light setpoints P(112) comprising heterogeneous values, corresponding in particular to a sharp cut-off in the corresponding digital setpoint image. In this case, the filtering gives rise to a substantial correction of the PWM control parameter. There is therefore almost no need to switch on the elementary light source 112 in question, since the stray luminosity coming from the neighboring sources is sufficiently high. Switching the source 112 on would only negatively affect the desired effect of a horizontal cut-off.

A matrix light source can produce a large number of elementary light sources, for example several thousand electroluminescent semiconductor element-based light sources, of LED type. Such a light source can cover a large field of view, of the order of 35°. In a lighting device for a motor vehicle, an optical system comprising at least one optical lens is typically associated with such a matrix light source. Typically, the central portion of a projected image has high resolution, while the image edge regions have lower resolution. It has been observed that in a high-definition central region (corresponding to approximately −11° to 11° of aperture), the light emitted by an elementary source produces a projected pixel, and also contributes to the luminosity of approximately two neighboring pixels. The light emitted by an elementary source in an average region (corresponding to approximately +/−11 to 14) produces a projected pixel, and also contributes to the luminosity of approximately four neighboring pixels. In a low-resolution edge region, the light emitted from a single elementary source produces one projected pixel, and at the same time contributes to the luminosity of about eight pixels in its vicinity. The spatial distribution of the light emitted by an elementary source of the matrix light source is therefore not homogeneous for all of the elementary sources that make up the matrix light source, but depends on the location of the elementary source with respect to the optical system, even though the characteristics of the elementary sources are otherwise the same. Since the optical behavior of such sources is similar along the vertical axis, one filter kernel K per column of the image to be filtered may be sufficient, thus reducing the computing task.

Figure 6:
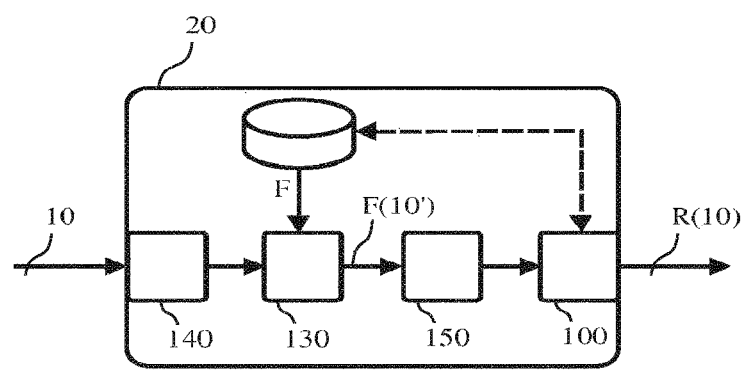
FIG. 6 is a schematic illustration of a lighting device in accordance with one preferred embodiment of the invention.

FIG. 6 schematically shows a lighting device 20 according to one preferred embodiment of the invention. It comprises a digital lighting unit 100 having a matrix light source composed of elementary light sources as well as an optical system. A data reception unit 140 is able to receive a lighting setpoint 10, for example in the form of a digital image over a data bus of a motor vehicle. Typically, the setpoint comes from a central control module of the vehicle. The device comprises a microcontroller element 130 configured to adapt each received lighting setpoint 10 in accordance with the method described above. The device further comprises a control unit 150 intended to control the lighting unit 100 in accordance with the filtered parameters F(10'). To do this, the duty cycle of a pulse-width-modulated control signal is preferably adapted so as to reflect the filtered parameter values F(10').

It goes without saying that the described embodiments do not limit the scope of protection of the invention. By referring to the description that has just been given, other embodiments may be contemplated without otherwise departing from the scope of the present invention.

The scope of protection is defined by the claims.

The invention claimed is:

1. A method for adapting a digital lighting setpoint intended to be projected by a digital lighting unit of a motor vehicle, comprising a matrix light source and an optical system, the digital lighting setpoint comprising an elementary light intensity setpoint for each elementary light source of the matrix light source, characterized in that the method comprises
   a) a step of converting, by means of a computing unit, each elementary light intensity setpoint into a parameter of an electrical signal to be applied to the elementary light source in order to achieve said elementary light intensity setpoint;
   b) a step of applying, by means of a computing unit, a digital filtering to a matrix grouping together the set of parameters before relaying the filtered parameters to the lighting unit, said digital filtering of a given parameter taking into account the light response of the corresponding elementary light source, this response comprising the contribution of the light beam generated by said elementary light source with respect to the light intensity of the corresponding projected pixel R and of the projected pixels that form part of a predetermined spatial neighborhood V of said projected pixel R.

2. The method as claimed in claim 1, wherein said electrical signal is a pulse-width-modulated electrical signal, said parameter being the duty cycle of this electrical signal.

3. The method as claimed in claim 1, wherein it comprises a preliminary step of measuring, for each elementary light source, the light response R, V projected by the corresponding elementary light source.

4. The method as claimed in claim 1, wherein the conversion step comprises applying a conversion function defined previously for each elementary light source.

5. The method as claimed in claim 1, wherein said filtering comprises applying a dedicated digital filter for each of the elementary light setpoints.

6. The method as claimed in claim 1, wherein said filtering comprises applying a dedicated digital filter for each column or row of elementary light setpoints.

7. The method as claimed in claim 1, wherein the lighting setpoint corresponds to a digital image having a resolution at least equal to the projection resolution of the lighting device.

8. A lighting device for a motor vehicle comprising a digital lighting unit having a matrix light source composed of elementary light sources as well as an optical system, the device further comprising a data reception unit intended to receive a lighting setpoint, characterized in that the device comprises a computing unit configured to adapt a received lighting setpoint in accordance with the method as claimed in claim 1, the device further comprising a control unit intended to control the lighting unit by means of electrical signals parameterized by the filtered parameters F.

9. A computer program comprising a sequence of instructions which, when they are executed by a processor, result in the processor implementing a method as claimed in claim 1.

10. A non-transitory computer-readable storage medium, said medium storing a computer program as claimed in claim 9.

11. A method for adapting a digital lighting setpoint intended to be projected by a digital lighting unit of a motor vehicle, comprising a matrix light source and an optical system, the digital lighting setpoint comprising an elementary light intensity setpoint for each elementary light source of the matrix light source, wherein the method comprises:
   a) a step of converting, by means of a computing unit, each elementary light intensity setpoint into a parameter of an electrical signal to be applied to the elementary light source in order to achieve said elementary light intensity setpoint;
   b) a step of applying, by means of a computing unit, a digital filtering to a matrix grouping together the set of parameters before relaying the filtered parameters to the lighting unit, said digital filtering of a given parameter taking into account the light response of the corresponding elementary light source, this response comprising the contribution of the light beam generated by said elementary light source with respect to the light intensity of the corresponding projected pixel R and of the projected pixels that form part of a predetermined spatial neighborhood V of said projected pixel R, wherein:
   the method includes a preliminary step of measuring, for each elementary light source, the light response R, V projected by the corresponding elementary light source,
   said light response for each elementary light source is stored in a memory element in the form of a distribution matrix P, the matrix P comprising the digitized contribution of the light beam generated by said elementary light source with respect to the light intensity of the corresponding projected pixel R as central element, and the matrix P further comprising the digitized contribution of the light beam generated by said elementary light source with respect to the intensity of the projected pixels that form part of a predetermined spatial neighborhood V of said projected pixel R as peripheral elements, each element of the matrix P thus corresponding to a projected pixel.

12. The method as claimed in claim 11, wherein the step of applying the digital filtering comprises the following steps:
   for each parameter of the matrix of parameters, associated with an elementary light source and with a distribution matrix P, considering a neighborhood V of parameters corresponding to the neighborhood V defined by the distribution matrix P;
   using the computing unit, multiplying one-by-one the elements of a normalized representation of the distribution matrix P and the neighborhood of parameters V;
   using the computing unit, calculating the arithmetic mean of the results of these multiplications, in order to obtain the filtered parameter F.

13. The method as claimed in claim 12, wherein the conversion step comprises applying a conversion function defined previously for each elementary light source.

14. The method as claimed in claim 11, wherein it comprises a preliminary step of measuring, for each elementary light source, the light response R, V projected by the corresponding elementary light source.

15. The method as claimed in claim 11, wherein the conversion step comprises applying a conversion function defined previously for each elementary light source.

16. The method as claimed in claim 11, wherein said filtering comprises applying a dedicated digital filter for each of the elementary light setpoints.

17. The method as claimed in claim 11, wherein said filtering comprises applying a dedicated digital filter for each column or row of elementary light setpoints.

18. The method as claimed in claim 11, wherein the lighting setpoint corresponds to a digital image having a resolution at least equal to the projection resolution of the lighting device.

19. A lighting device for a motor vehicle comprising a digital lighting unit having a matrix light source composed of elementary light sources as well as an optical system, the device further comprising a data reception unit intended to receive a lighting setpoint, characterized in that the device comprises a computing unit configured to adapt a received lighting setpoint in accordance with the method as claimed in claim 11, the device further comprising a control unit intended to control the lighting unit by means of electrical signals parameterized by the filtered parameters F.

20. A computer program comprising a sequence of instructions which, when they are executed by a processor, result in the processor implementing a method as claimed in claim 11.

* * * * *